United States Patent [19]
Wolff

[11] Patent Number: 5,353,580
[45] Date of Patent: Oct. 11, 1994

[54] MOWER WITH AN IMPROVED LOCKING DEVICE

[75] Inventor: Michel Wolff, Waltenheim sur Zorn, France

[73] Assignee: Kuhn S.A., Saverne Cedex, France

[21] Appl. No.: 12,901

[22] Filed: Feb. 3, 1993

[30] Foreign Application Priority Data

Feb. 12, 1992 [FR] France .................. 92 01735

[51] Int. Cl.⁵ .................................. A01D 34/66
[52] U.S. Cl. ...................................... 56/15.2; 56/6; 56/15.8; 56/DIG. 14
[58] Field of Search ............... 56/15.2, 14.9, 6, 15.1, 56/15.7, 15.8, 255, 295, DIG. 14

[56] References Cited

U.S. PATENT DOCUMENTS

| | | | |
|---|---|---|---|
| 4,723,396 | 2/1988 | Ermacora | 56/13.6 |
| 4,896,493 | 1/1990 | Neuerburg | 56/255 |
| 4,974,399 | 12/1990 | Haberkorn | 56/6 |
| 5,101,616 | 4/1992 | Wolff | 56/15.2 |
| 5,199,249 | 4/1993 | Wattron et al. | 56/15.2 |
| 5,199,250 | 4/1993 | Ermacora et al. | 56/15.2 |

FOREIGN PATENT DOCUMENTS

| | | |
|---|---|---|
| 0361573 | 4/1990 | European Pat. Off. . |
| 9112331 | 1/1992 | Fed. Rep. of Germany . |
| 2660519 | 4/1990 | France . |
| 6918351 | 6/1971 | Netherlands . |
| 7115956 | 5/1973 | Netherlands . |
| 2157936 | 11/1985 | United Kingdom . |

*Primary Examiner*—Terry Lee Melius
*Attorney, Agent, or Firm*—Oblon, Spivak, McClelland, Maier & Neustadt

[57] ABSTRACT

A mower in which during work a limiting device is connected to a hitching structure by a hinge having a geometric axis that is at least approximately parallel to a geometric axis of a first hinge. The limiting device is connected so as to slide in relation to a support beam, and for transport, the sliding connection of the limiting device can be blocked in relation to the support beam by a locking device that is used to lock a cutting mechanism in its raised position for transport.

17 Claims, 5 Drawing Sheets

MOWER WITH AN IMPROVED LOCKING DEVICE

BACKGROUND OF THE INVENTION

1. Field of the Invention

The invention relates to a mower including a cutting mechanism which extends, during work, crosswise to a direction of work; a hitching structure for connection to a raising device of a power-driven vehicle; a support beam having a first end connected to the hitching structure by a first hinge having a first forwardly directed geometric axis, and a second end connected to the cutting mechanism with a second hinge having a second forwardly directed geometric axis; a limiting device installed between the hitching structure and the support beam for limiting a pivoting of the support beam in relation to the hitching structure around the first geometric axis of the first hinge; an operating element for pivoting the cutting mechanism into a raised position for transport in relation to the support beam around the second geometric axis of the second hinge; and a locking device for locking the cutting mechanism in the raised position for transport. transport, in relation to the support beam around the geometric axis of the second hinge, is a hydraulic cylinder hinged to the upper part of the hitching structure with a pin and to the cutting mechanism by means of a lever. Due to this hydraulic cylinder, the user can therefore easily bring the cutting mechanism into its raised position for transport.

The locking device that is used to lock the cutting mechanism in its raised position for transport comprises a hook hinged to the support beam and intended to be hooked to the cutting mechanism. Because of this, even in case of rupture of the power supply of the operating element, the cutting mechanism is held in its raised position.

Although the known mower described above is provided with advantageous characteristics, this embodiment has several drawbacks.

SUMMARY OF THE INVENTION

An object of this invention is to remedy the drawbacks while preserving the advantages of the known mower.

For this purpose, the present invention provides for a novel mower in which during work the limiting device is connected to the hitching structure by a third hinge having a third geometric axis that is at least approximately parallel to the first geometric axis of the first hinge. The limiting device is connected so as to slide or the like in relation to the support beam. During transport, the sliding connection or the like of the limiting device can be blocked in relation to the

DESCRIPTION OF THE RELATED ART

A related mower is described in FR-A-2 660 519. The limiting device of this mower is installed between the upper part of the hitching structure and the middle of the support beam. At its upper part, the limiting device comprises an oblong hole, through which a pin integral with the hitching structure passes, while at its lower part, the limiting device is hinged to the support beam by a pivot pin. Because of this, the pivoting of the support beam in relation to the hitching structure around the geometric axis of the first hinge is advantageously limited. In combination with the raising device of the tractor and the operating element, the limiting device also makes it possible to lift the cutting mechanism parallel to the ground.

The operating element which is especially intended to pivot the cutting mechanism into a raised position for support beam by the locking device.

Consequently, the support beam is, in addition, immobilized in relation to the hitching structure, which reduces the swinging of the cutting mechanism during transport.

Since the locking device is used at the same time to lock the cutting mechanism in its raised position for transport and to block the sliding end of the limiting device, the use of the locking device is particularly advantageous.

According to another feature of the invention, the end of the limiting device which is connected so as to slide in relation to the support beam comprises a pivot pin. The pivot pin exhibits a fourth geometric axis that is at least approximately parallel to the first geometric axis of the first hinge and slides more particularly in at least one oblong hole placed at least approximately in the vicinity of the median part of the support beam.

Advantageously, the support beam comprises a support in two parts, each of the parts of which exhibits an oblong hole. Further, each longitudinal end of the pivot pin is guided in one of the corresponding oblong holes.

In addition, the longitudinal axis of each oblong hole extends at least approximately along the longitudinal axis of the support beam. In a first solution, it is also provided according to the present invention that the outside end of each oblong hole is hollowed out at its upper part, so as to house the pivot pin there during transport. Furthermore, in a second solution that is different from the previous one, the transport position of the end of the limiting device which is connected so as to slide or the like can be modified by an adjusting device. This adjusting device comprises a bolt-and-nut device.

According to a further feature of the present invention, it is provided for both previous solutions, that the locking device comprises a hook that is used to lock the cutting mechanism in its raised position for transport and to block the sliding connection or the like of the limiting device in relation to the support beam.

The hook can be hinged to a pivot pin of the limiting device and intended to be hooked to a hooking element of the cutting mechanism.

Further, it is advantageous that the hook extends at least approximately in a vertical plane containing the limiting device.

The hook is kept in its locked position by a spring and its unlocking is performed from the power-driven vehicle using a remote control.

Furthermore, to enable an automatic hooking of the hook to the cutting mechanism as soon as the latter arrives in its raised position for transport, the front part of the hook is bevelled.

Consequently, the locking and unlocking of the cutting mechanism is performed without the user being forced to leave the cab of the power-driven vehicle.

In the embodiments according to the invention in which the limiting device comprises a pivot pin that slides in at least one oblong hole placed at least approximately in the middle of the support beam and where the hook is held in locked position by a spring, it is provided that the hook comprises an inverted U-shaped connecting part whose ends are hinged to the pivot pin and that the spring is a blade spring fastened to the upper part of the connecting part, so as to press on the limiting device.

According to an additional feature of the invention, it is further provided that the operating element extend between the upper part of the hitching structure and the cutting mechanism.

In a further embodiment, the operating element can be a cylinder connected to the cutting mechanism by an oblong hole.

Due to the oblong hole, the cutting mechanism has the capability of adjusting to the contour of the ground without being hindered by the cylinder. The play of the oblong hole is eliminated when the cutting mechanism is raised to its transport position.

In its raised position for transport, the cutting mechanism is in contact with the support beam by a stop. The latter limits the pivoting of the cutting mechanism toward the hitching structure around the second geometric axis of the second hinge. This stop can advantageously be integral with a support of the support beam, so that the hooking element of the cutting mechanism can come in contact with the stop.

According to the invention, this mower further comprises elements for processing the cut product.

Thus, the mower comprises a cutting mechanism which extends, during work, crosswise to a direction of work; a hitching structure for connection to a raising device of a power-driven vehicle; a support beam having a first end connected to the hitching structure by a first hinge having a first forwardly directed geometric axis, and a second end connected to the cutting mechanism with a second hinge having a second forwardly directed geometric axis; a limiting device installed between the hitching structure and the support beam for limiting a pivoting of the support beam in relation to the hitching structure around the first geometric axis of the first hinge; an operating element for pivoting the cutting mechanism into a raised position for transport in relation to the support beam around the second geometric axis of the second hinge; and a locking device for locking the cutting mechanism in the raised position for transport.

During work, the limiting device is connected to the hitching structure by a third hinge having a third geometric axis that is at least approximately parallel to the first geometric axis of the first hinge, and the limiting device is connected so as to slide or the like in relation to the support beam. During transport the sliding connection or the like of the limiting device can be blocked in relation to the support beam by the locking device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DESCRIPTION OF THE PREFERRED EMBODIMENTS

Figure 1:
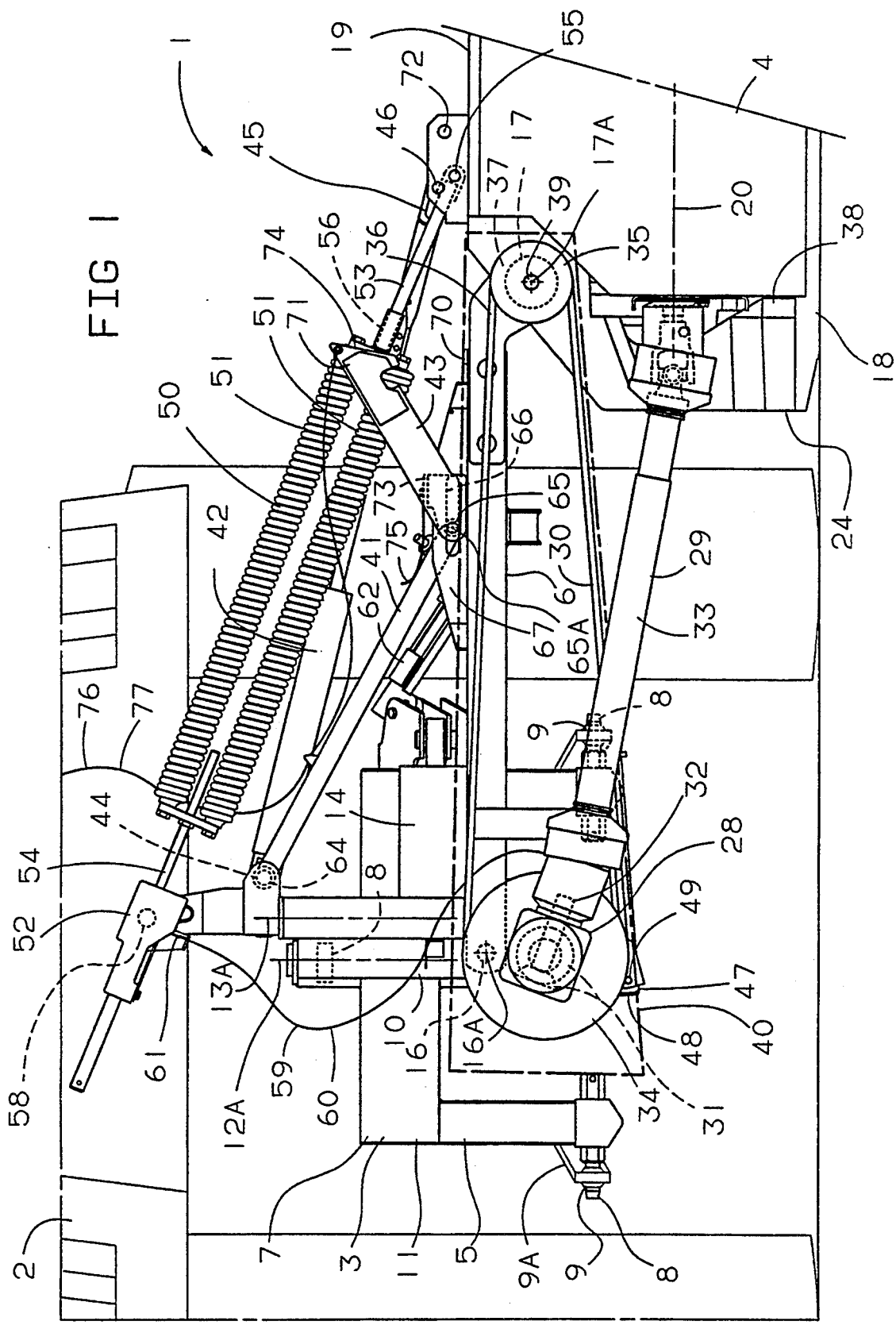
FIG. 1 represents, in work position, a mower according to the invention as seen from the back in the direction of advance during work and connected to a power-driven vehicle.
Figure 2:
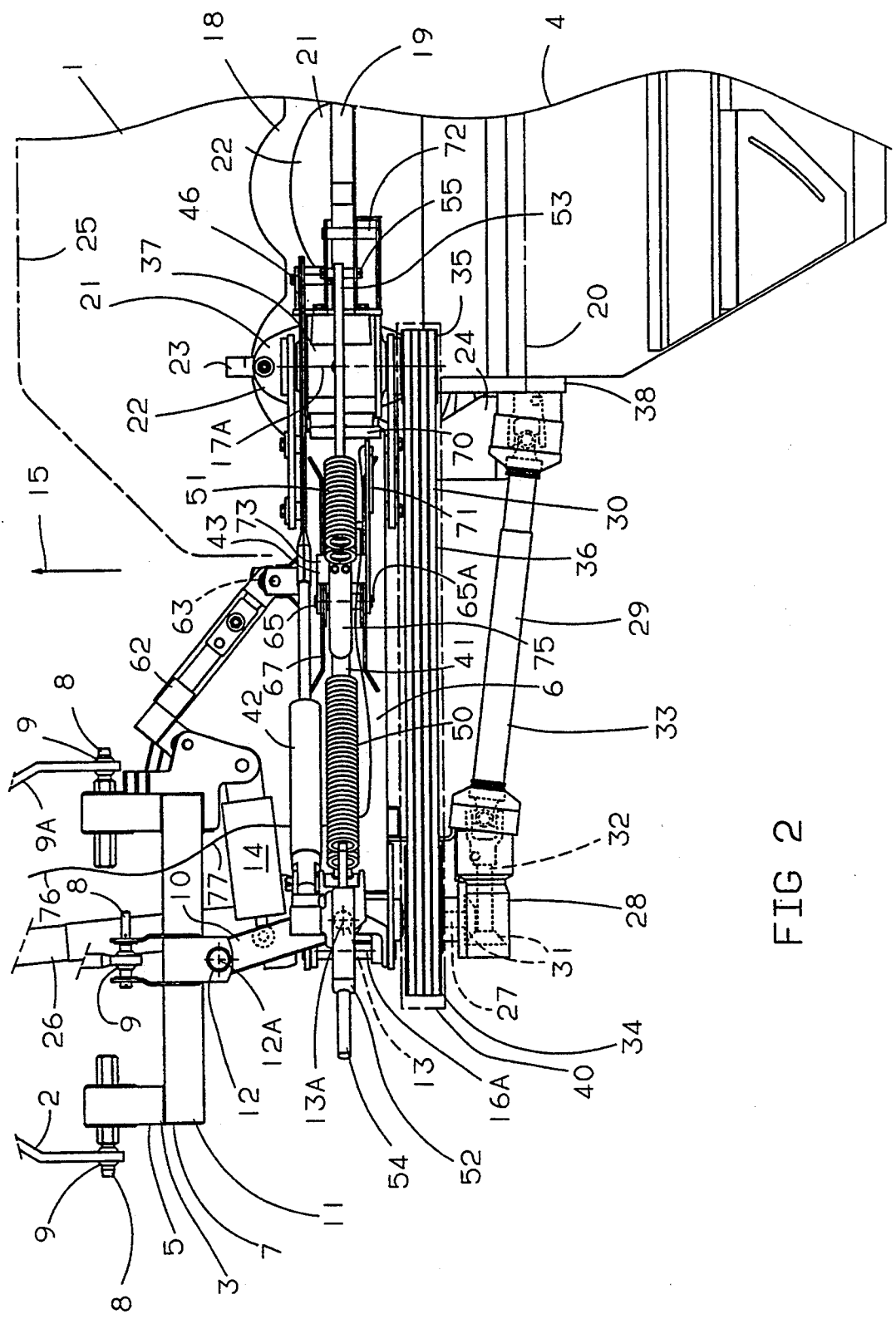
FIG. 2 represents a top view of the mower of FIG. 1 still in the work position.
Figure 3:
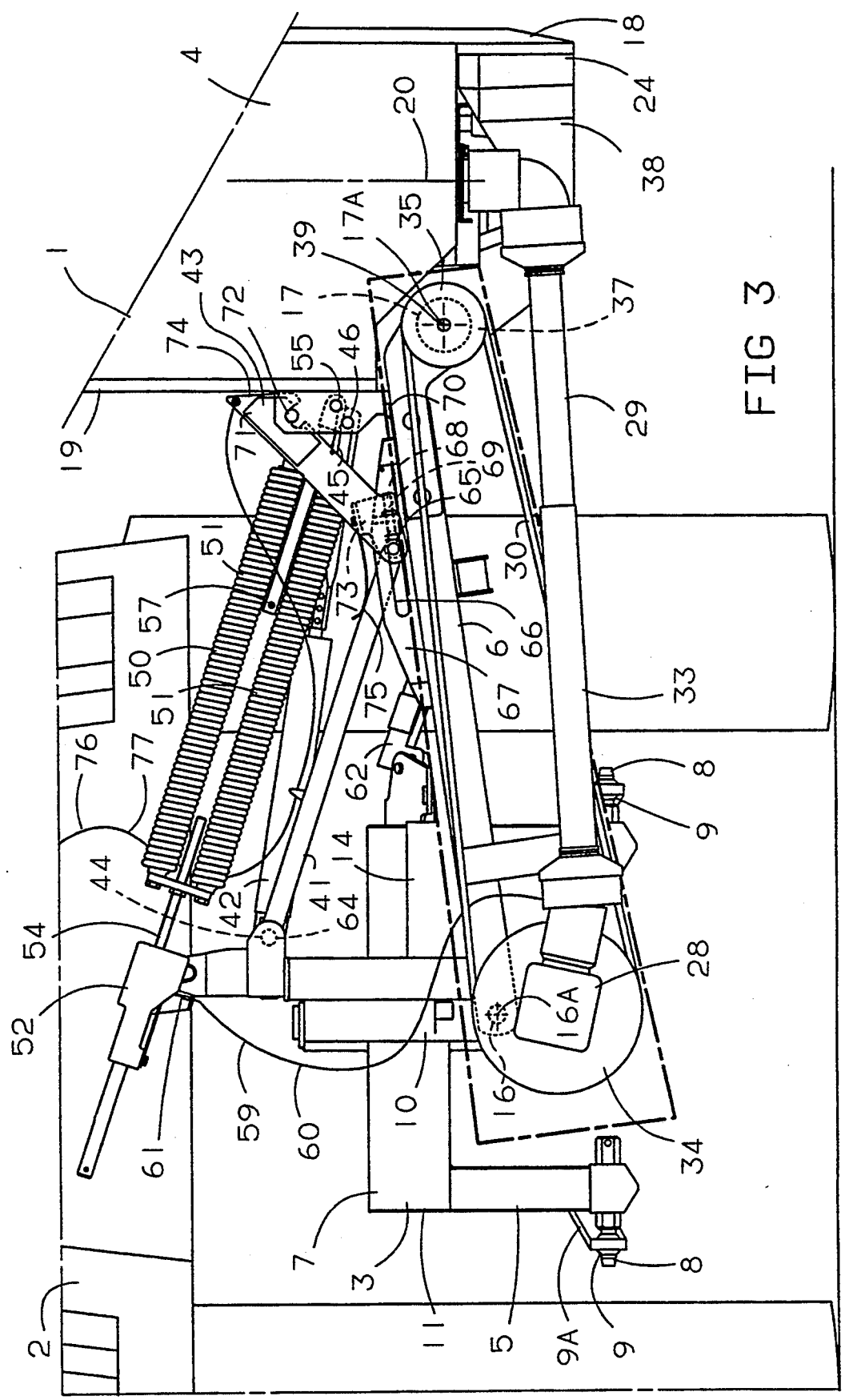
FIG. 3 represents the mower of FIG. 1 with the cutting mechanism in its raised position for transport.

Referring now to the drawings, wherein like reference numerals designate identical or corresponding parts throughout the several views, a mower (1) according to the present invention appears in FIGS. 1 to 3. The mower (1) is connected to a farm tractor (2).

The mower (1) is composed mainly of a chassis (3), comprising a hitching structure (5) connected to a support beam (6), and a harvesting mechanism (4).

Hitching structure (5) comprises a gantry (7) provided, on its front part, with three hitching points (8) intended to be connected to three hitching points (9) of raising device (9A) of farm tractor (2). Between gantry (7) and support beam (6) a positioning arm (10) is installed that is used to bring support beam (6) and harvesting mechanism (4) back to the median plane of tractor (2), to facilitate its transport. For this purpose, positioning arm (10) of hitching structure (5) is connected at least approximately to the middle of upper beam (11) of gantry (7), by a cylindrical hinge (12) having a geometric axis (12A) that is at least approximately vertical, and in the vicinity of the inside longitudinal end of support beam (6) with a pivot pin (13) having a geometric axis (13A) that is at least approximately vertical. A positioning element (14), made in the form of a hydraulic cylinder, is installed between positioning arm (10) and the end of gantry (7) opposite harvesting mechanism (4). In this way, the positioning arm (10) can be pivoted around geometric axis (12A) of cylindrical hinge (12) from a work position (FIGS. 1 to 3), in which it extends at least approximately in the direction of work (15), to a transport position (not shown) in which the positioning arm (10) is at least approximately parallel to the upper beam (11) of gantry (7).

As for support beam (6), it extends in top view during work, crosswise to direction of work (15) and just behind hitching structure (5). At its inside longitudinal end, support beam (6) is hinged to the lower part of pivot pin (13) by a first pivot connection (16) having a geometric axis (16A) directed forward and extending, as seen in the direction of advance (15) during work, at least approximately in the vicinity of the center of the triangle defined by the three hitching points (8) of hitching structure (5). At its outside longitudinal end, support beam (6) of chassis (3) is hinged to inside longitudinal end (24) of harvesting mechanism (4) by a second pivot connection (17) having a geometric axis (17A) directed forward. The second pivot connection (17) is installed on the upper part of harvesting mechanism (4), so that during work, the geometric axes (16A, 17A) of the two corresponding pivot connections (16, 17) extend at least approximately at the same level, which makes it possible for support beam (6) to be directed at least approximately horizontally. Due to this chassis (3), harvesting mechanism (4) can extend, during work, beside the path of tractor (2) and easily adjust to the contour of the ground.

As represented in FIGS. 1 to 3, harvesting mechanism (4) comprises a cutting bar (18), a carrying structure (19) and a processing rotor (20), of which only the axis of rotation is seen. Cutting bar (18) is equipped with a plurality of cutting elements (21) comprising disks (22) provided on their periphery with cutting tools (23). During work, these disks (22) rotate around geometric axes directed upward. Further, in a way known to a person skilled in the art, disks (22) which each extend at a longitudinal end of cutting bar (18) are surmounted with a drum (not shown), that rotates around the same geometric axis as the disk (22) that it surmounts. These two drums gauge the flow of product cut by cutting elements (21).

Furthermore, above cutting bar (18) extends carrying structure (19) which is in particular intended to support protective elements (25) (represented in dot-and-dash lines in FIG. 2). The carrying structure (19) is connected to cutting bar (18) by side walls (38) that extend downward.

Processing rotor (20), known to a person skilled in the art, extends behind cutting bar (18) and at least approximately parallel to the longitudinal axis of cutting bar (18). This processing rotor (20) is guided in rotation in the vicinity of its longitudinal ends in side walls (38) of carrying structure (19) and is intended to pack the product cut by cutting elements (21).

The driving in rotation of processing rotor (20) and disks (22) of cutting bar (18) is performed from tractor (2) to which mower (1) is hitched. Actually, it is the power take-off (not shown) that drives, by a telescopic shaft with universal joints (26), input shaft (27) of transmission housing (28). This input shaft (27) transmits the movement of rotation, on the one hand, to processing rotor (20), by drive elements (29), and on the other hand, to disks (22) of cutting bar (18) with transmission elements (30).

To communicate the movement of input shaft (27) of transmission housing (28) to processing rotor (20), drive elements (29) comprise successively a pair of bevel gears (31), one of which is integral with the input shaft (27) and the other with output shaft (32) of transmission housing (28), and a telescopic shaft with universal joints (33) extending crosswise to the direction of work (15). This telescopic shaft with universal joints (33) communicates the movement of rotation of output shaft (32) of transmission housing (28) to processing rotor (20), whose longitudinal end goes through, for this purpose, inside side wall (38) of carrying structure (19).

The transmission of the movement of rotation of input shaft (27) of transmission housing (28) to disks (22) of cutting bar (18) is performed, as previously stated, by transmission elements (30). The latter comprise mainly a pair of pulleys (34, 35) on which belts (36) are wound and a transmission housing (37), by which carrying structure (19) of harvesting mechanism (4) is connected to support beam (6).

Transmission housing (37) is actually provided with two cylindrical bearing surfaces embodying second pivot connection (17) and made in the form of bearings in which an input shaft (39) is guided in rotation, whose axis of rotation is merged with geometric axis (17A) of the second pivot connection (17). By this input shaft (39), disks (22) and the drums of cutting bar (18) are driven in rotation.

In the back, input shaft (39) extends outside of transmission housing (37) and carries one (35) of the pulleys (34, 35) of transmission elements (30). The other pulley (34) is carried by input shaft (27) of transmission housing (28) which is installed in the vicinity of hitching structure (5). The transmission of the movement of this pulley (34) to pulley (35) is assured by belts (36) which are wound on the pulleys (34, 35). A protective hood (40) (shown in dot-and-dash lines) partially surrounds pulleys (34, 35) and belts (36).

As FIGS. 1 and 2 illustrate, chassis (3) also comprises a limiting device (41). The limiting device (41) is used to limit the pivoting of support beam (6) around geometric axis (16A) of first pivot connection (16) and thereby, the displacement downward of second pivot connection (17) which connects harvesting mechanism (4) to support beam (6). The user can therefore, for transport for example, actuate the raising device (9A) of tractor (2) so as to elongate as much as possible limiting device (41) and lift harvesting mechanism (4).

To lift harvesting mechanism (4) entirely and to keep it in a windrow position, a raising cylinder (42) is further provided. This raising cylinder (42) is hinged at one of its longitudinal ends near the upper end of pivot pin (13) of hitching structure (5), by a hinge (44) whose geometric axis extends at least approximately parallel to geometric axis (16A) of first pivot connection (16).

At its other longitudinal end, raising cylinder (42) exhibits an oblong hole (45) through which a pin (46) passes that is directed at least approximately in direction of work (15) and fastened to carrying structure (19) of harvesting mechanism (4). During work, pin (46) normally extends in the middle of oblong hole (45) and therefore does not interfere with the displacement in height of harvesting mechanism (4), or its pivoting around geometric axis (17A) of second pivot connection (17). Further, when the user wishes to place mower (1) in its windrow position by actuating the hydraulic raising (9A) of tractor (2), chassis (3) and the upper end of raising cylinder (42) are displaced upward, bringing the lower end of oblong hole (45) against pin (46) of harvesting mechanism (4). Therefore, harvesting mechanism (4) no longer pivots around geometric axis (17A) of second pivot connection (17), but moves away from the ground. Once in its windrow position, mower (1) can then be placed in its transport position due to positioning cylinder (14) which brings harvesting mechanism (4) back to the median plane of tractor (2) (this has not been shown in FIG. 3) and to raising cylinder (42) which makes it possible to pivot harvesting mechanism (4) into a vertical transport position (FIG. 3). A locking device (43) which will be described in greater detail later is used to lock harvesting mechanism (4) in its raised position for transport.

During the removal of the mower (1), harvesting mechanism (4) rests longitudinally on the ground and support beam (6) is supported by a removal element (47) (FIG. 1). In this embodiment, removal element (47) is a brace (48) connected to support beam (6) in the vicinity of first pivot connection (16), with a cylindrical hinge (49) having a geometric axis that is at least approximately parallel to geometric axis (16A) of the first pivot connection (16). Because of this, brace (48) can, for removal, be pivoted from a transport or work position, in which brace (48) is retracted, into a removal position in which brace (48) is intended to support support beam (6).

In a removal position, it is also possible to pivot hitching structure (5) in relation to support beam (6) around geometric axis (16A) of first pivot connection (16). Such an arrangement substantially facilitates the hitching of mower (1) to the three hitching points (9) of tractor (2).

Mower (1) further comprises a load-lightening element (50) intended to lighten harvesting mechanism (4) during work. The load-lightening element (50) extends between the upper end of pivot pin (13) of hitching structure (5) and the inside end of carrying structure (19). Load-lightening element (50) is composed mainly of at least one draw spring (51) associated with a control device (52). Actually, two draw springs (51) are hinged, on the one hand, to carrying structure (19) of harvesting mechanism (4), by a tie rod (53) and, on the other hand, to control device (52), by a second tie rod (54). First tie rod (53) is hinged at one of its ends to carrying structure (19) of harvesting mechanism (4), by a pin (55) directed at least approximately parallel to geometric axis (17A) of second pivot connection (17). At its other end, first tie rod (53) is connected to the group of springs (51) with a slide connection (56) (FIG. 1), allowing a sliding of the first tie rod (53) in relation to the group of springs (51) during transport, and being locked by a stop (57) (FIG. 3) of the first tie rod (53) during work. The control device (52) is hinged to pivot pin (13) with the cylindrical hinge (58) (FIG. 1) having a geometric axis that is at least approximately parallel to geometric axis (16A) of first pivot connection (16). In this embodiment, this cylindrical hinge (58), connecting control device (52) to hitching structure (5), extends above hinge (44) connecting raising cylinder (42) to the hitching structure (5).

Control device (52) which is known to a person skilled in the art, makes it possible to cancel the action of draw springs (51) for the removal, so as to allow, as previously stated, the pivoting of hitching structure (5) around geometric axis (16A) of first pivot connection (16). For this purpose, control device (52) comprises a remote control (59) which comprises a sheath (60) inside of which a cable (not shown) can be translated and that is connected, on the one hand, to brace (48) and, on the other hand, to a retractable stop (61) of control device (52). Consequently, as soon as the brace (48) is displaced from its work position to its removal position, this has the effect of acting on control device (52) and of canceling the action of draw springs (51) by retracting stop (61).

The mower (1) furthermore comprises a retaining element (62) placed between support beam (6) and hitching structure (5), preventing under normal work conditions, the pivoting of support beam (6) around geometric axis (13A) of pivot pin (13). As seen in the direction of work (15), connection (63) (FIG. 2) of retaining element (62) to support beam (6) extends at least approximately at the same level as geometric axis (16A) of first pivot connection (16) and about at two-thirds of the distance separating geometric axis (16A) of first pivot connection (16) from geometric axis (17A) of second pivot connection (17). Furthermore, the connection (63) is installed so that during work, retaining element (62) has a sharp inclination upward and forward.

Due to retaining element (62), inside end (24) of harvesting mechanism (4) is lightened in a dynamic manner. The load-lightening of the outside end of harvesting mechanism (4) is assured by load-lightening element (50) which creates a torque around geometric axis (17A), while participating in the load-lightening of inside end (24) of harvesting mechanism (4).

Further, since retaining element (62) is not subjected to any force when mower (1) is in its removal position, the hitching and the removal of the mower (1) are simplified. Actually, in the removal position, retaining element (62) allows the pivoting of hitching structure (5) in relation to support beam (6) around geometric axis (16A) of first hinge (16).

In this connection, limiting device (41) is connected according to the invention, on the one hand, to hitching structure (5) by a hinge (64) exhibiting a geometric axis that is at least approximately parallel to geometric axis (16A) of first pivot connection (16), while, on the other hand, the limiting device (41) is mounted to slide in relation to support beam (6). Such an arrangement therefore allows the pivoting of hitching structure (5) or of support beam (6) around geometric axis (16A) of first pivot connection (16), respectively during removal or during work.

As shown in FIG. 2, limiting device (41) extends, in top view, at least approximately along the longitudinal axis of support beam (6), from the vicinity of hinge (44) that connects raising cylinder (42) to hitching structure (5) up to in the vicinity of the middle of support beam (6). At this level, limiting device (41) comprises a pivot pin (65) exhibiting a geometric axis (65A) directed at least approximately parallel to geometric axis (16A) of first pivot connection (16) and each longitudinal end of which passes through a corresponding oblong hole (66) integral with support beam (6). These two oblong holes (66) of similar dimensions, extend at least approximately along the longitudinal axis of support beam (6) and are made in a support (67) fastened to the upper face of the support beam (6). By so doing, during the pivoting of support beam (6) in relation to hitching structure (5) around geometric axis (16A) of first pivot connection (16), pivot pin (65) of limiting device (41) slides in oblong holes (66) integral with support beam (6).

The maximum pivoting of support beam (6) corresponds to the length of oblong holes (66) that limit the travel of pivot pin (65). However, if the user wishes, it is possible to modify the transport position of pivot pin (65) with an adjusting device (68) (FIG. 3). The adjusting device (68), for this purpose, comprises a bolt and nut device (69) installed between pivot pin (65) and second pivot connection (17), and whose bolt extends at least approximately parallel to the longitudinal axis of oblong holes (66). By so doing, limiting device (41) or its pivot pin (65) strikes against one end of the bolt, when harvesting mechanism (4) is raised into its transport position by raising cylinder (42). Actually, raising cylinder (42) causes harvesting mechanism (4) to pivot from its windrow position (not shown) where it extends horizontally above the ground, to its raised position (FIG. 3) around geometric axis (17A) of second pivot connection (17). The pivoting of harvesting mechanism (4) is stopped from the moment carrying structure (19) of harvesting mechanism (4) arrives in contact with support beam (6) by a stop (70). More or less at the same time, the action of raising cylinder (42) is also transmitted by harvesting mechanism (4) to support beam (6), so that the latter also pivots upward, but around geometric axis (16A) of first pivot connection (16). The pivoting of support beam (6) is stopped from the moment limiting device (41) or its pivot pin (65) arrives at the end of travel.

According to the invention, the sliding end of limiting device (41) can be locked in this position in relation to support beam (6) by locking device (43). Considering that the locking device (43) is also used to lock harvesting mechanism (4) in its raised position for transport, harvesting mechanism (4) is kept perfectly in position during transport.

Furthermore, since locking device (43) is used at the same time to lock harvesting mechanism (4) in its raised position for transport and to lock the sliding end of the limiting device, the use of the locking device is particularly advantageous. Actually, in this example of the embodiment according to the invention, locking device (43) comprises a hook (71) which is hinged to pivot pin (65) of limiting device (41) and which is intended to be hooked to a hooking element (72) of harvesting mechanism (4). The hook (71) comprises an inverted "U"-shaped connecting part (73) whose ends are hinged to the pivot pin (65) to assure a better guiding in rotation of the hook (71).

To make possible an automatic hooking of hook (71) to hooking element (72) as soon as harvesting mechanism (4) arrives in its raised position for transport, the front part (74) of hook (71) is beveled in a way known to a person skilled in the art, and a blade spring (75) tends to hook hook (71) to the hooking element (72). For this purpose, blade spring (75) is connected to the upper part of connecting part (73) of hook (71) and presses on the lower end of the limiting device. During transport, harvesting mechanism (4) is thus locked in relation to hitching structure (5) via support beam (6).

At this level, it should be noted that adjusting device (68) precisely positions pivot pin (65) of limiting device (41), so that hook (71) can be hooked to hooking element (72), despite the production tolerances.

The unlocking of locking device (43) is performed by a remote control (76) (FIGS. 1 to 3) on which the user acts from the cab of tractor (2). Advantageously, remote control (76) comprises a small cord (77) fastened in the vicinity of the front part (74) of hook (71). Because of this, when the user pulls on small cord (77), hook (71) pivots around geometric axis (65A) of pivot pin (65) and releases hooking element (72) from harvesting mechanism (4). While maintaining his action on small cord (77), the user controls the emerging of the rod of raising cylinder (42), which has the effect of pivoting harvesting mechanism (4) downward around geometric axis (17A) of second pivot connection (17). As soon as hook (71) is no longer able to be hooked to hooking element (72), the user can stop pulling on small cord (77), while continuing to allow harvesting mechanism (4) to descend to its windrow position. Then, due to raising device (9A) of tractor (2), the user sets harvesting mechanism (4) on the ground and the work can begin.

Figure 4:
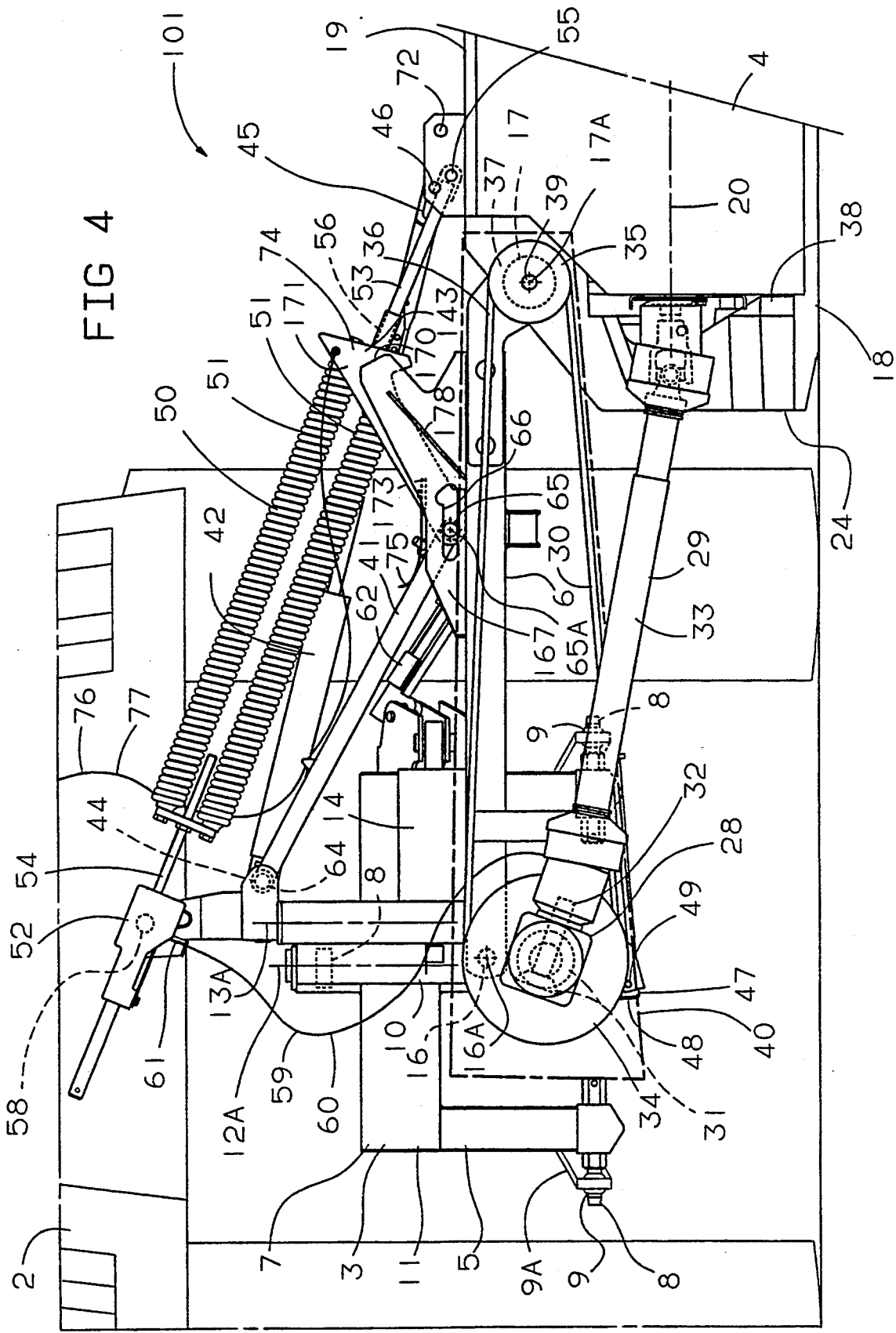
FIG. 4 represents, in the work position, another example of a mower according to the invention as seen from the back in the direction of advance during work and connected to a power-driven vehicle.
Figure 5:
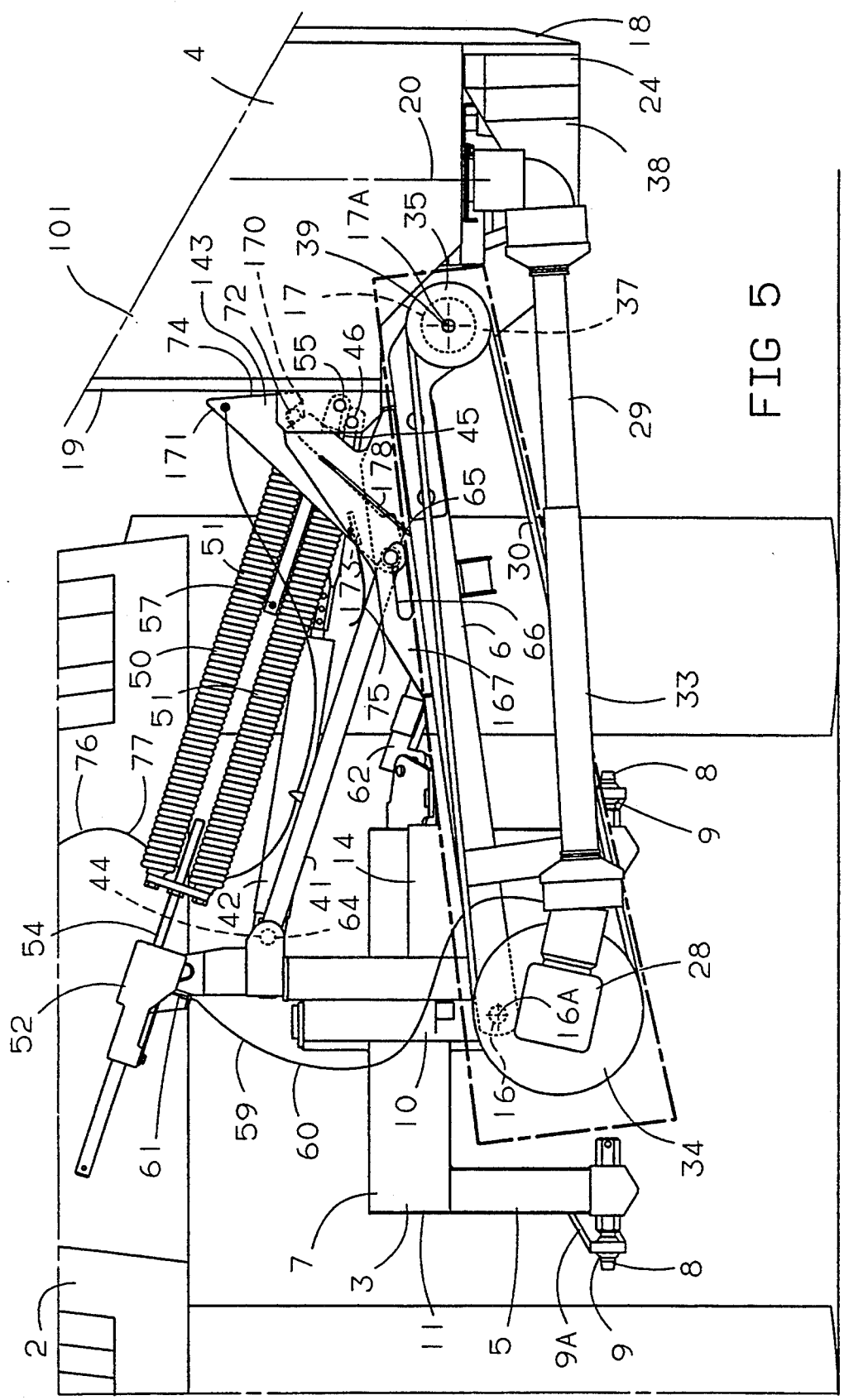
FIG. 5 represents the mower of FIG. 4 with the cutting mechanism in its raised position for transport.

FIGS. 4 and 5 show another example of a further embodiment of a mower (101) according to the invention. The mower (101), in an identical form, comprises almost all the means of the previously described mower (1). Consequently, these means will not be again described. However, mower (101) exhibits several differences.

First, in contrast with stop (70) which is placed at the outside end of support beam (6) of mower (1), a stop (170) of mower (101) is integral with a part of support (167) of support beam (6). In addition, the pivoting of harvesting mechanism (4), toward its raised position for transport, is stopped from the moment hooking element (72) of harvesting mechanism (4) arrives in contact with stop (170) of support (167). By so doing, hook (171) of locking device (143) is automatically hooked to the hooking element (72).

Since such an arrangement considerably limits the number of parts that define the relative position of pivot pin (65) in relation to hooking element (72), the production tolerances of the parts can be less narrow. The absence of adjusting device (68) on this mower (101) is a consequence of this.

Another difference between the mower (101) and the previously described mower (1) appears at the level of oblong holes (66). At the outside longitudinal end of oblong holes (66), each oblong hole (66) has been hollowed out at its upper part. The purpose of such an arrangement is the following. When harvesting mechanism (4) has been brought into its raised position for transport by raising cylinder (42), hooking element (72) is in contact with support (167) by stop (170), and hook (171) of locking device (143) is automatically hooked to the hooking element (72). More or less at the same time, the action of raising cylinder (42) also has the effect of pivoting support beam (6) upward and of bringing pivot pin (65) to the outside end of oblong holes (66). Then, the user elongates raising cylinder (42), by allowing, for example, a portion of the oil to flow to tractor (2).

By so doing, support beam (6) pivots downward around geometric axis (16A) of first pivot connection (16) and pivot pin (65) is housed in the hollowed-out part of each oblong hole (66). In the transport position, it is provided that harvesting mechanism (4) leans somewhat in the direction of hitching structure (5), so as to press more particularly on support (167), so as not to pull hook (171) too much.

Furthermore, considering the fact that hook (171) extends between the two parts of support (167), the pulling force that harvesting mechanism (4) could create on hook (171) would advantageously be transmitted to support (167) of support beam (6) by each longitudinal end of pivot pin (65). Further, the essential part of the weight of harvesting mechanism (4) and of support beam (6) is supported during transport by limiting device (41) and its pivot pin (65). The hollowed-out part of each oblong hole (66) thus promotes a better contact of pivot pin (65) with support (167) to transmit these considerable forces in complete safety.

Moreover, considering that hook (171) which is connected to hooking element (72) holds pivot pin (65) at the outside part of oblong holes (66), the pivot pin (65) is not likely to come out of the hollowed-out part when tractor (2) rolls over an obstacle that the terrain presents.

A final difference between mower (1) and mower (101) appears at the level of connecting part (173) which is not in an inverted "U" shape, but in an inverted "L" shape. Nevertheless, blade spring (75) is still fastened to the horizontal portion of this connecting part (173).

Also, it is further possible to see in FIGS. 4 and 5 that the portion of support (167) that comprises stop (170) is stiffened by a stiffening element (178).

Finally, various modifications are possible within the scope of the invention described here, particularly with regard to the constitution of the various elements or by substitution of technical equivalents. In an embodiment not shown, the limiting device can, for example, comprise two elements hinged to one another by a pivot pin to which the locking device is connected, while at its lower end the limiting device is hinged to the support beam by a stationary pin.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A mover comprising:
   a cutting mechanism which extends, during work, crosswise to a direction of work;
   a hitching structure for connection to a raising device of a power-driven vehicle;
   a support beam having a first end connected to the hitching structure by a first hinge having a first forwardly directed geometric axis, and a second end connected to the cutting mechanism with a second hinge having a second forwardly directed geometric axis;
   a limiting device installed between the hitching structure and the support beam for limiting a pivoting of the support beam in relation to the hitching structure around the first geometric axis of the first hinge;
   an operating element for pivoting the cutting mechanism into a raised position for transport in relation to the support beam around the second geometric axis of the second hinge; and
   a locking device for locking the cutting mechanism in the raised position for transport;
   wherein:
   during work, the limiting device is connected to the hitching structure by a third hinge having a third geometric axis that is at least approximately parallel to the first geometric axis of the first hinge, and the limiting device is slidably connected to the support beam so as to slide in relation to the support beam, and for transport, the sliding of the limiting device in relation to the support beam can be blocked by said locking device.

2. The mower according to claim 1, wherein:
   one end of the limiting device is connected so as to slide in relation to the support beam, said one end of the limiting device comprising a pivot pin having a fourth geometric axis that is at least approximately parallel to the first geometric axis of the first hinge, said pivot pin sliding in at least one oblong hole placed at least approximately in the vicinity of a median part of said support beam.

3. The mower according to claim 2, wherein:
   the support beam comprises a support having two parts, each of said two parts of the support comprising an oblong hole, and each longitudinal end of the pivot pin being guided in one of said oblong holes.

4. The mower according to claim 3, wherein:
   a longitudinal axis of each of said oblong holes extends at least approximately along a longitudinal axis of the support beam.

5. The mower according to claim 3, wherein:
   an outside end of each oblong hole is hollowed out at its upper part, so as to house the pivot pin therein during transport.

6. The mower according to claim 1, wherein:
   a transport position of the end of the limiting device which is connected so as to slide can be modified by an adjusting device.

7. The mower according to claim 6, wherein the adjusting device comprises a bolt-and-nut device.

8. The mower according to claim 1, wherein:
   the locking device comprises a hook that is used to lock the cutting mechanism in its raised position for transport and to block the sliding connection of the limiting device in relation to the support beam.

9. The mower according to claim 8, wherein the hook is hinged to a pivot pin of the limiting device and is intended to be hooked to a hooking element of the cutting mechanism.

10. The mower according to claim 8, wherein the hook extends at least approximately in a vertical plane containing the limiting device.

11. The mower according to claim 8, wherein the hook is held in its locked position by a spring and unlocking is performed from the power-driven vehicle with a remote control.

12. The mower according to claim 11, wherein:
    one end of the limiting device is connected so as to slide in relation to the support beam, said one end of the limiting device comprising a pivot pin having a geometric axis that is at least approximately parallel to the first geometric axis of the first hinge, said pivot pin sliding in at least one oblong hole placed at least approximately in the vicinity of a median part of said support beam; and
    the hook comprises an inverted U-shaped connecting part whose ends are hinged to said pivot pin, and the spring is a blade spring fastened to an upper part of said connecting part, so as to press on the limiting device.

13. The mower according to claim 1, wherein the operating element extends between an upper part of the hitching structure and the cutting mechanism.

14. The mower according to claim 13, wherein the operating element is a cylinder connected to the cutting mechanism by an oblong hole.

15. The mower according to claim 1, wherein in the raised position for transport, the cutting mechanism is in contact with the support beam by a stop.

16. The mower according to claim 15, wherein the stop is integral with a support of the support beam, and a hooking element of the cutting mechanism comes into contact with said stop.

17. The mower according to claim 1, further comprising means for processing a cut product.

* * * * *